Aug. 25, 1942.  G. VAN DAAM  2,294,010
ELECTRICALLY HEATED WATER BAG
Filed Nov. 22, 1940
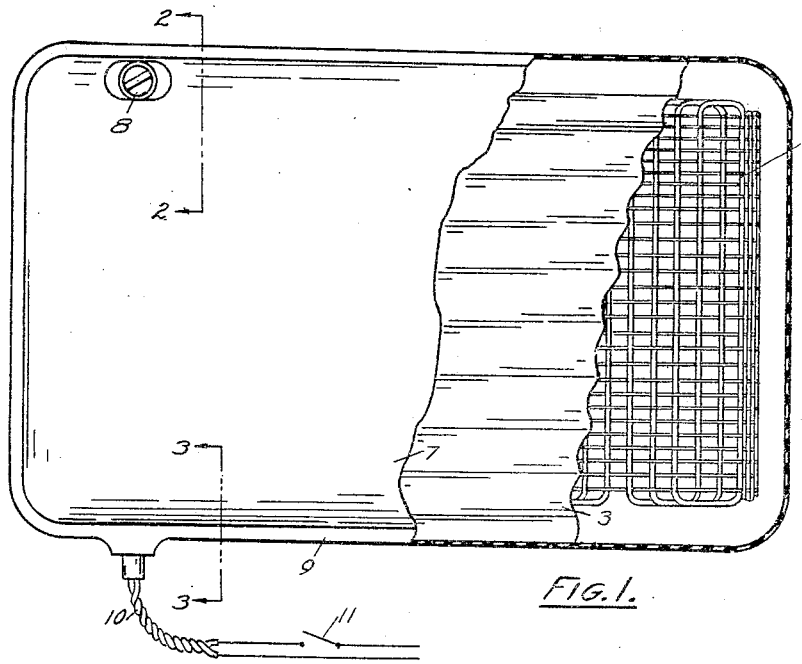
FIG. 1.
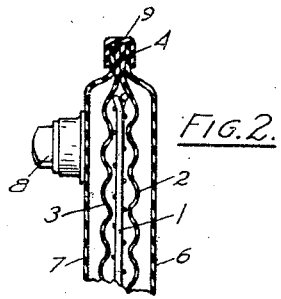
FIG. 2.
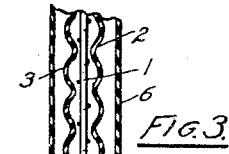
FIG. 3.
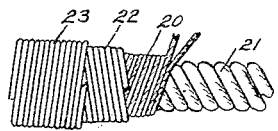
FIG. 4.
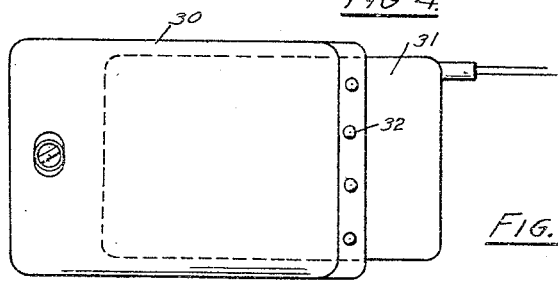
FIG. 5.
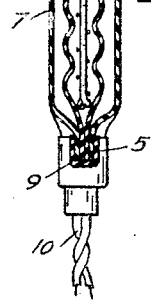
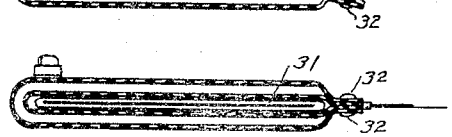
FIG. 6.
FIG. 7.
INVENTOR
Gerrit Van Daam
BY
Florian G. Miller
ATTORNEYS Patented Aug. 25, 1942

2,294,010

UNITED STATES PATENT OFFICE 2,294,010

ELECTRICALLY HEATED WATER BAG

Gerrit Van Daam, Buffalo, N. Y.

Application November 22, 1940, Serial No. 366,670

4 Claims. (Cl. 219—46)

The present invention relates to a hot water bag and more particularly to an electrically heated hot water bag. All devices of this character made according to the teachings of the prior art and with which I am familiar have been too heavy to lie on the abdomen of sick persons. Electric heating pads without the liquid are not suitable in many cases because of the dry heat. Prior water bags have been very impractical because they would not hold their inherent heat for very long periods of time, and thus have not been able to maintain a steady temperature.

It is, accordingly, an object of my invention to overcome the above and other defects in water heating bags, and it is more particularly an object of my invention to provide a water heating bag which is simple in construction, cheap in cost, easy to maintain, and economical in manufacture.

Another object of my invention is to provide an electrical water heating bag which provides an even, steady temperature.

Another object of my invention is to provide a method of constructing an electrical water heating bag.

Another object of my invention is to provide an electrical water heating bag which may be used for cooling.

Another object of my invention is to provide electrical heating means for a hot water bag which is waterproof.

Other objects of my invention will become evident from the following detailed description taken in conjunction with the accompanying drawing in which:

Fig. 1 is a plan view with parts broken away of my novel electrical hot water heating bag.

Fig. 2 is a view taken on the line 2—2 of Fig. 1.

Fig. 3 is a view taken on the line 3—3 of Fig. 1.

Fig. 4 is a fragmentary view showing the winding of a resistance wire.

Fig. 5 is a plan view of a modified form of electrical water heating bag.

Fig. 6 is a side elevational view in cross section of a modified form of electric heating bag with the heating element being inserted in the bag.

Fig. 7 is a side elevational view in cross section of the modified form of bag shown in Fig. 6 with the heating element disposed therein.

Referring to the drawing, Figs. 1, 2 and 3 show an interwoven heating element 1 covered by oppositely disposed sheets 2 and 3 cemented at their marginal edges 4 and 5. Two outer sheets 6 and 7 are disposed over the sheets 2 and 3 covering the heating element 1 and are cemented together at their marginal edges over the marginal cemented edges 4 and 5 of the inner sheets 2 and 3. Water or other fluid is disposed between the inner and outer sheets. A suitable aperture is provided with a threaded cap 8 for permitting the entrance of fluid between the inner and outer sheets 2 and 6 and 3 and 7. A marginal cover 9 is cemented over the marginal portions of the inner and outer sheets to firmly secure the bag in a water-tight unitary structure. Leads 10 extend from the heating element 1 and are controlled by suitable switching means 11.

Fig. 4 shows one method of preparing the resistance wires in the heating element. Resistance wire 20 is wound over a core 21 and a double winding 22 and 23 is disposed over the resistance wire 20. This form of winding provides a flexible but yet rigid heating element. Resistance wires may be covered by a rubber tube or one made of a latex product or the like. The latex product known as neoprene is suitable for this purpose.

A modified form of electrical hot water heater comprises a more or less U shaped water bag 30 whereby an interwoven heating element 31 may be inserted in one end thereof. Any suitable means may be provided for closing the open end of the bag such as the snaps 32. In this form of electrically heated water bag, the heating element 31 may be removed and a cooling media such as dry ice may be inserted therein to provide a cooling means. Cooling fins (not shown), may be provided on the outside of the U shaped water bag.

In operation, a comparatively small amount of water is disposed in the water compartment between the inner and outer sheets. Because of the small amount of water to be heated, it is quickly heated to maximum temperature. The heating element is disposed between two inner sheets and is kept absolutely dry.

It will be evident that I have provided an electrically heated water bag which maintains an even temperature and which can be heated to maximum temperature in a minimum time.

Various changes may be made in the specific embodiment of the present invention without departing from the spirit thereof or from the scope of the appended claims.

What I claim is:

1. In an electrically heated water bag, in combination, a removable, comparatively thin, heating element substantially the area of said water bag, oppositely disposed sheets secured at their marginal edges covering said heating element, comparatively small and flat fluid compartments adjacent said outer sheets having an inlet opening for fluid, and means for controlling said heating element.

2. In an electrically heated water bag, in combination, a removable, comparatively thin, heating element of substantially the area of said water bag, inner oppositely disposed sheets secured at their marginal edges covering said heating element, outer sheets disposed adjacent said inner sheets and secured at their marginal edges to the marginal edges of said inner sheets, said inner and outer sheets forming comparatively flat fluid compartments having an inlet opening for fluid, and means for controlling said heating element.

3. In an electrically heated water bag, in combination, a removable, comparatively thin, heating element of substantially the area of said water bag, inner rubber sheets disposed on opposite sides of said heating element and cemented together at their marginal edges, outer rubber sheets covering said inner sheets and cemented at their marginal edges to the marginal edges of the inner sheets, said inner and outer sheets forming comparatively flat fluid compartments having an inlet opening for fluid, and means for controlling said heating element.

4. In an electrically heated hot water bag, in combination, comparatively flat fluid container with an inlet opening for fluid having legs forming a pocket open at one end, a removable heating element for disposal in said pocket, and means for controlling said heating element.

GERRIT VAN DAAM.